(12) United States Patent
Kruecke et al.

(10) Patent No.: US 6,380,275 B1
(45) Date of Patent: Apr. 30, 2002

(54) PRODUCTION OF POLYURETHANE FOAMS AND OF FOAMED THERMOPLASTIC SYNTHETIC RESINS

(75) Inventors: Werner Kruecke, Hannover; Lothar Zipfel, Laatzen, both of (DE)

(73) Assignee: Solvay Fluor und Derivate GmbH, Hannover (DE)

( * ) Notice: Subject to any disclaimer, the term of this patent is extended or adjusted under 35 U.S.C. 154(b) by 0 days.

(21) Appl. No.: 09/315,816

(22) Filed: May 21, 1999

Related U.S. Application Data

(60) Provisional application No. 60/089,122, filed on Jun. 12, 1998, and provisional application No. 60/089,123, filed on Jun. 12, 1998.

(30) Foreign Application Priority Data

May 22, 1998 (DE) .......................... 198 22 945
May 22, 1998 (DE) .......................... 198 22 944

(51) Int. Cl.[7] .................................. C08J 9/14
(52) U.S. Cl. ................ 521/131; 510/412; 521/155; 521/170; 521/172; 521/174
(58) Field of Search ................ 521/131, 155, 521/170, 172, 174; 510/412

(56) References Cited

U.S. PATENT DOCUMENTS 5,348,681 A    9/1994   Desbiendras 5,889,286 A  * 3/1999   Barthelemy et al. ........ 521/131

FOREIGN PATENT DOCUMENTS

| EP | 742250 A1 | 11/1996 |
| EP | 765901 A1 | 4/1997 |
| EP | 842972 A1 | 5/1998 |
| WO | WO 96/14354 | 5/1996 |
| WO | WO 97/31989 | 9/1997 |
| WO | WO 98/02484 | 1/1998 |
| WO | WO 98/27145 | 6/1998 |
| WO | WO 98/39378 | 9/1998 |

\* cited by examiner

*Primary Examiner*—John M. Cooney, Jr.
(74) *Attorney, Agent, or Firm*—Crowell & Moring LLP

(57) ABSTRACT

A method for the production of polyurethane foams and of thermoplastic foams is described. As blowing agent, a composition is used, which contains or consists of pentafluorobutane, preferably pentafluorobutane (HFC-365mfc) and at least one further blowing agent selected from the group comprising; difluoromethane (HFC-32); difluoroethane, preferably 1,1-difluoroethane (HFC-152a); 1,1,2,2-tetrafluoroethane (HFC-134); 1,1,1,2-tetrafluoroethane (HFC-134a); hexafluoropropane, preferably 1,1,1,3,3,3-hexafluoropropane (HFC-236fa); 1,1,2,3,3,3-hexafluoropropane (HFC-236ea) and heptafluoropropane, preferably 1,1,1,2,3,3,3-heptafluoropropane (HFC-227ea), low-boiling, optionally halogenated hydrocarbons and/or low-boiling, optionally halogenated ethers.

25 Claims, No Drawings

PRODUCTION OF POLYURETHANE FOAMS AND OF FOAMED THERMOPLASTIC SYNTHETIC RESINS

CROSS REFERENCE TO RELATED APPLICATIONS

This application claims priority based on co-pending U.S. provisional application Nos. 60/089,122 and 60/089,123, both filed Jun. 12, 1998.

The invention relates to a method for production of polyurethane foams and of foamed, thermoplastic synthetic resins, to new blowing agents suitable for this purpose as well as to polyurethane foam and to foamed synthetic resins, which can be obtained using the blowing agents.

Polyurethane foams are used as thermally insulating and noise-insulating building materials. The production of one-component and multi-component polyurethane foams with blowing agents based on liquefied carbon dioxide is disclosed in the WO 96/14354.

Foamed, thermoplastic synthetic resins can be used, for example, in the form of panels, as thermally insulating and noise-insulating building materials. U.S. Pat. No. 5,276,063 discloses a method for producing extruded, closed-cell alkenylaromatic polymers using a blowing agent mixture, which contains 1,1-difluoroethane as well as a further blowing agent with a lower vapor pressure and an even higher solubility in the molten polymer. Suitable alkenylaromatic polymers are, for example, polymers of styrene, α-methylstyrene, ethylstyrene, vinylbenzene, vinyltoluene, chlorostyrene and bromostyrene. These polymers can, if desired, contain copolymers, such as acrylic acid, acrylonitrile or butadiene. U.S. Pat. No. 5,204,169 discloses the production of foamed, thermoplastic polymers, such as polystyrene, using perfluorinated hydrocarbons with two carbon atoms. The foamed material is suitable particularly for food packaging. The EP-A-0 436 847 discloses the production of foamed thermoplastic molded objects based on polyphenylene ether resins. Hydrocarbons are recommended as blowing agents. Halogenated hydrocarbons with one or two carbon atoms are also mentioned as being usable.

It is an object of the present invention to provide a method for the production of polyurethane foams by means of a selected, novel advantageous blowing agent. This objective is accomplished by the method and the blowing agents of the present invention.

It is an object of the present invention to provide a method for the production of foamed, thermoplastic synthetic resins by means of a novel, advantageous blowing agent. This objective is accomplished by the method and the blowing agents of the present invention.

The starting point was the surprising realization that pentafluorobutane, particularly 1,1,1,3,3-pentafluorobutane (HFC-365mfc), in admixture with certain other blowing agents, is a very suitable composition for the production of polyurethane foams or of thermoplastic synthetic resin foams.

According to the inventive method for producing polyurethane foams and of foamed thermoplastic resins by foaming a thermoplastic synthetic resin with the help of a blowing agent, a composition is used as blowing agent, which contains or consists of a) pentafluorobutane, preferably 1,1,1,3,3-pentafluorobutane (HFC-365mfc) and b) at least one further blowing agent selected from the group comprising low-boiling, optionally halogenated hydrocarbons, ethers and halogenated ethers; difluoromethane (HFC-32); difluoroethane, preferably 1,1-difluoroethane (HFC-152a); 1,1,2,2-tetrafluoroethane (HFC-134); 1,1,1,2-tetrafluoroethane (HFC-134a); pentafluoropropane, preferably 1,1,1,3,3-pentafluoropropane (HFC-245fa); hexafluoropropane, preferably 1,1,2,3,3,3-hexafluoropropane (HFC-236ea) or 1,1,1,3,3,3-hexafluoropropane (HFC-236fa); and heptafluoropropane, preferably 1,1,1,2,3,3,3-heptafluoropropane (HFC-227ea).

The preferred pentafluorobutane is HFC-365mfc. This is explained in greater detail in the following.

According to one embodiment, a blowing agent is used, which consists of 1,1,1,3,3-pentafluorobutane, 1,1,1,3,3-pentafluoropropane and at least one of the blowing agents named under b).

The preferred embodiment contains 1,1,1,3,3-pentafluorobutane as the component named under a).

The inventive method provides that a composition is used as blowing agent, which contains or consists of 1,1,1,3,3-pentafluorobutane (HFC-365mfc) and at least one further blowing agent selected from the group consisting low-boiling, optionally halogenated hydrocarbons, ethers and halogenated ethers; difluoromethane (HFC-32); difluoroethane, preferably 1,1-difluoroethane (HFC-152a); 1,1,2,2-tetrafluoroethane (HFC-134); 1,1,1,2-tetrafluoroethane (HFC-134a); pentafluoropropane, preferably 1,1,1,3,3-pentafluoropropane (HFC-245fa); hexafluoropropane, preferably 1,1,2,3,3,3-hexafluoropropane (HFC-236ea) or 1,1,1,3,3,3-hexafluoropropane (HFC-236fa); and heptafluoropropane, preferably 1,1,1,2,3,3,3-heptafluoropropane (HFC-227ea).

The concept of "low-boiling, optionally halogenated hydrocarbons, ethers and halogenated ethers" means compounds with a boiling point lower than 70° C., preferably lower than 55° C. Suitable hydrocarbons are especially those with two to five carbon atoms, for example, ethane, propane, butane, pentane, cyclopentane and hexane, as well as mixtures thereof. Moreover, isomerically pure compounds or mixtures of different isomers can be used. "Butane" is understood to be mixtures of n-butane and i-butane. Such mixtures are commercially available. Pure n-butane or i-butane or their mixtures of any composition can also be used, but are very expensive. The same holds true for higher homologs, such as pentane, etc. $CH_2Cl_2$, for example, is a usable halogenated hydrocarbon.

Preferably, the blowing agent composition contains 5 to 95% by weight of 1,1,1,3,3-pentafluorobutane and especially 10 to 70% by weight.

Blowing agent compositions which, in addition to HFC-365mfc and one or several of the fluorinated hydrocarbons or hydrocarbons given above, also contain liquefied carbon dioxide, are likewise well suited for use in the inventive method. In that case, preferably 2 to 50% by weight of carbon dioxide are contained in the blowing agent composition. In addition, the blowing agent composition may contain up to 30% by weight of additives, which modify the properties of the synthetic resin that is to be produced.

Particularly suitable blowing agents include, for example, the following compositions, which may contain or consist of (examples of compositions, the parts by weight being given in parentheses):

HFC-365mfc and HFC-152a (70:30);
HFC-365mfc and HFC-32 (70:30);
HFC-365mfc, HFC-152a and $CO_2$ (60:30:10);
HFC-365mfc, HFC-32 and $CO_2$ (60:30:10);

HFC-365mfc, HFC-152a and butane (60:30:10);
HFC-365mfc, HFC-32 and butane (60:30:10);
HFC-365mfc, HFC-152a and HFC-134a (60:25:15);
HFC-365mfc, HFC-32 and HFC-134a (60:25:15);
HFC-365mfc and dimethyl ether (80:20);
HFC-365mfc and pentane (50:50);
HFC-365mfc and propane (70:30);
HFC-365mfc and ethane (90:10);
HFC-365mfc, pentane and $CO_2$ (45:45:10);
HFC-365mfc, butane and $CO_2$ (50:40:10);
HFC-365mfc, propane and $CO_2$ (70:20:10);
HFC-365mfc, ethane and $CO_2$ (90:5:5).

Preferred blowing agent compositions contain 1,1,1,3,3-pentafluorobutane and/or difluoromethane and 1,1,-difluoroethane or they consist of these compounds. In particular, compositions are used, which contain or consist of 10 to 70% by weight of HFC-365mfc and 90 to 30% by weight of HFC-152a and/or HFC-32.

A preferred embodiment, the preparation of polyurethane (PU) foams, is explained in detail.

The outstandingly useful flame retardants include, for example reactive flame retardants, such as brominated polyols. Flame retardants, based on organic phosphorus compounds, such as phosphate esters and phosphonates, are likewise suitable. These have organic groups, which may be substituted by one or more halogen atoms. The organic groups have an aliphatic or aromatic character. Very well suitable are phosphate esters and phosphonate esters, which are substituted by three $C_1$ to $C_6$ alkyl groups, which may have one or two halogen atoms, such as trischloroisopropyl phosphate, trischloroethyl phosphate, trischloropropyl phosphate, dimethylethyl phosphate, trisdichloroisopropyl phosphate, dimethylmethyl phosphonate; trischloropropyl phosphate is preferred.

One embodiment of the inventive method of producing polyurethane foams provides that if a) is HFC-365mfc and b) 1,1,1,2-tetrafluoroethane (HFC 134a); 1,1,1,3,3-pentafluoropropane (HFC-245fa), 1,1,1,3,3,3-hexafluoropropane (HFC-236fa); or 1,1,1,2,3,3,3-heptafluoropropane (HFC-227ea), and carbon dioxide, low-boiling optionally halogenated hydrocarbons, ethers or halogenated ethers are not contained, the blowing agent composition contains or consists of less than 50% by weight of 1,1,1,3,3-pentafluorobutane and more than 50% by weight 1,1,1,2-tetrafluoroethane; 1,1,1,3,3-pentafluoropropane; 1,1,1,3,3,3-hexafluoropropane or 1,1,1,2,3,3,3-heptafluoropropane.

The effective amount of blowing agent composition, which is used in the inventive method, can be determined by simple small-scale tests. Advantageously, the blowing agent composition is used in an amount of 1 to 50% by weight, based on the total mixture of the synthetic resin or the preliminary products (polyol, isocyanate, auxiliary materials and blowing agent composition), which is to be foamed.

A further object of the invention are essentially closed-cell polyurethane foams, which are characterized by containing a blowing agent composition, which is to be used in the inventive method, in the cells.

Pursuant to the invention, high-resistance foam and also highly resilient foams, based on isocyanate, can be produced. The production of such foams and the basic materials, which can be used for this purpose, and the nature of the foam production are disclosed in the European patent application EP-A-0 381 986, in "Ullmann's Encyclopedia of Industrial Chemistry", 5th edition, volume A21, pages 665–680, the international patent applications WO 92/00345, 96/30439, 96/14354 and the German Offenlegungsschrift DE 44 22 714 A1. Polyisocyanates with, for example, 2 to 4 isocyanate groups are used.

They have an aliphatic hydrocarbon group with up to 18 carbon atoms, a cycloaliphatic hydrocarbon group with up to 15 carbon atoms, an aromatic hydrocarbon group with 6 to 15 carbon atoms or an aliphatic hydrocarbon group with 8 to 15 carbon atoms. Starting materials, which are particularly preferred in industry are, for example, 2,4- and 2,6-toluylene diisocyanate, diphenylmethane diisocyanate, polymethylenepolyphenol isocyanate and their mixtures. So-called "modified polyisocyanates", which contain carbodiimide groups, urethane groups, allophanate groups, isocyanurate groups, urea groups or biuret groups, can also be used.

Further starting components include compounds with at least two hydrogen atoms capable of reacting with isocyanate groups. These are, in particular, compounds with a molecular weight of 400 to 10,000, which preferably may contain 2 to 8 hydroxyl groups and, furthermore, amino groups, thiol groups or carboxyl groups.

Optionally, further auxiliary materials and additives can be used. For example, chemical blowing agents, such as water or other readily volatile organic substances can be used additionally as physical blowing agents. Catalysts, for example, tertiary amines such as dimethylcyclohexylamine and/or organometallic compounds, such as tin salts of carboxylic acids, can also be used. Surface active additives, such as emulsifiers or foam stabilizers, such as siloxane polyether copolymers, can be used, as can reaction retarding agents, cell regulators, such as paraffins, fatty alcohols or dimethylpolysiloxanes, pigments, dyes, flame retardants, such as phosphate esters or phosphonate esters, for example, trischloroisopropyl phosphate, can be used. Furthermore, stabilizers, which prevent aging and weathering effects, plasticizers, fillers, dyes, antistatic agents, nucleating agents, pore regulators or biocides can be used.

Suitable catalysts are named, for example, in the international patent application WO 96/14354. These include organic amines, amnine alcohols and aminoethers, for example, morphiline compounds, such as dimethylcyclohexylamine, diethanolamine, 2-dimethylaminoethyl-3-dimethylaminopropyl ether, 2-dimethylaminoethyl ether, 2,2-dimorpholinodiethyl ether, N,N-dimethylaminoethylmorpholine and N-dimethylmorpholine. Organometallic compounds, such as tin, cobalt or iron compounds, can also be used as catalyst. Examples are tin dioctoate, cobalt naphthenate, dibutyl tin dilaurate and iron acetonyl acetate.

The blowing agents may contain auxiliary materials and additives, one or more catalysts, flame retardants, emulsifiers, foam stabilizers, binding agents, cross linking agents, UV stabilizers, nucleating agents and optionally further blowing gases. The blowing agent may be added, for example, to the propolymers of polyol and polyisocyanate or diisocyanate, which are then foamed.

It is an advantageous feature of the inventive method that the blowing agent composition employed, which also is a part of the invention, has advantageous properties with respect to ODP, GWP and photosmog. Compared to polyurethane foams, which have been produced with pure hydrocarbons as blowing agents, the foams, produced by the inventive method, are distinguished by a better thermal conductivity.

A particular advantage of the polyurethane foams, obtainable by the inventive method, becomes effective at lower temperatures, generally below about 15 C. Surprisingly, the polyurethane foams, which can be obtained by the inventive method, not only have a more advantageous thermal conductivity (that is, less heat is transferred) than foams, which were prepared from pure hydrocarbons, but even compared to foams, which were prepared with pure pentafluorobutane (HFC-365mfc), the thermal conductivity is lower. In largely close-celled polyurethane foams, which were produced with blowing agent mixtures, which contain pentafluorobutane, preferably 1,1,1,3,3-pentafluorobutane, and at least one of the above-named further blowing agents, a synergistic effect of the blowing agent mixtures used can be noted with respect to the thermal conductivity, that is, the heat insulation capability. The polyurethane foams, obtainable using pentafluorobutane, preferably HFC-365mfc and at least one other of the blowing agents named above, are therefore particularly suitable for insulating against cold in a temperature range below about 15° C.

In the following, the preparation of thermoplastic foams is explained in detail.

With the inventive method, the thermoplastic synthetic resins, based on polymeric alkenylaromatic compounds and mentioned in U.S. Pat. Nos. 5,204,169 and 5,276,063, and the thermoplastic synthetic resins, based on polyphenyl ether compounds and named in the EP-A-0 436 847 can, for example, be foamed. Thermoplastic synthetic resins based on polyethylene, polyvinylchloride (PVC) and poly (ethylene terephthalate) (PET) and polypropylene can also be foamed. The use of thermoplastic synthetic resins, based on polystyrene, polyethylene and polypropylene, which are to be foamed by the inventive method, is particularly preferred, the use of polystyrene as thermoplastic synthetic resin being especially preferred.

One embodiment of the inventive method of producing synthetic resins on the basis of polystyrene or polyethylene provides that if a) is HFC-365mfc and b) 1,1,1,2-tetrafluoroethane (HFC 134a); 1,1,1,3,3-pentafluoropropane (HFC-245fa), 1,1,1,3,3,3-hexafluoropropane (HFC-236fa); or 1,1,1,2,3,3,3-heptafluoropropane (HFC-227ea), but carbon dioxide is not contained, the blowing agent composition contains less than 50% by weight of 1,1,1,3,3-pentafluorobutane and more than 50% by weight 1,1,1,2-tetrafluoroethane; 1,1,1,3,3-pentafluoropropane; 1,1,1,3,3,3-hexafluoropropane or 1,1,1,2,3,3,3-heptafluoropropane or consists thereof. The same proviso also holds good for this embodiment, if no other blowing agent from the group of low-boiling, optionally halogenated hydrocarbons, chlorine and halogenated ethers is contained.

Advantageously, the blowing agent composition is used in an amount of 1 to 30% by weight, based on the total mixture of the thermoplastic synthetic resin and blowing agent composition, which is to be foamed.

A further object of the present invention is a blowing agent composition, which can be used for the inventive method. It contains or consists of a) pentafluorobutane, preferably 1,1,1,3,3-pentafluorobutane (HFC-365mfc) and b) at least one further blowing agent selected from the group comprising low-boiling, optionally halogenated hydrocarbons, ethers and halogenated ethers; difluoromethane (HFC-32); difluoroethane, preferably difluoroethane (HFC-152a); 1,1,2,2-tetrafluoroethane (HFC-134); 1,1, 1,2-tetrafluoroethane (HFC-134a); pentafluoropropane, preferably 1,1,1,3,3-pentafluoropropane (HFC-245fa); hexafluoropropane, preferably 1,1,2,3,3,3-hexafluoropropane (HFC-236ea) or 1,1,1,3,3,3-hexafluoropropane (HFC-236fa); and heptafluoropropane, preferably 1,1,1,2,3,3,3-heptafluoropropane (HFC-227ea). A preferred composition contains or consists of a) 1,1,1,3, 3-pentafluorobutane (HFC-365mfc) and b) at least one further blowing agent selected from the group comprising ethane, propane, butane, pentane; difluoromethane (HFC-32); difluoroethane (HFC-152a); 1,1,2,2-tetrafluoroethane (HFC-134); 1,1,1,2-tetrafluoroethane (HFC-134a); 1,1,1,3, 3-pentafluoropropane (HFC-245fa); 1,1,1,3,3,3-hexafluoropropane (HFC-236fa) and 1,1,1,2,3,3,3-heptafluoropropane (HFC-227ea). Preferably it contains 5 to 95% by weight and, especially, 10 to 70% by weight of 1,1,1,3,3-pentafluorobutane (HFC-365mfc).

Suitable compositions contain or consist of HFC-365mfc and HFC-152a; HFC-365mfc and HFC-32; HFC-365mfc, HFC-152a and $CO_2$; HFC-365mfc, HFC-32 and $CO_2$; HFC-365mfc, HFC-152a and butane; HFC-365mfc, HFC-32 and butane; HFC-365mfc, HFC-152a and HFC-134a; HFC-365mfc, HFC-32 and HFC-134a; HFC365mfc and dimethyl ether; HFC-365mfc and pentane; HFC-365mfc and propane; HFC-365mfc and ethane; HFC-365mfc, pentane and $CO_2$; HFC-365mfc, butane and $CO_2$; HFC-365mfc, propane and $CO_2$; HFC-365mfc, ethane and $CO_2$.

According to a preferred embodiment, the blowing agent composition contains 1,1,1,3,3-pentafluorobutane (HFC-365mfc) and difluoromethane and/or 1,1-difluoroethane (HFC-152a) or consists of these compounds. In particular, 10 to 70% by weight of 1,1,1,3,3-pentafluorobutane and 90 to 30% by weight of 1,1-difluoroethane or difluoromethane are contained or the blowing agent composition consists of these components in the quantity ranges given.

The blowing agent composition may also contain 2 to 50% by weight of liquefied carbon dioxide.

One embodiment of the blowing agent composition, provides that if a) HFC-365mfc and b) 1,1,1,2-tetrafluoroethane (HFC-134a); 1,1,1,3,3-pentafluoropropane (HFC-245fa); 1,1,1,3,3,3-hexafluoropropane (HFC-236fa) or 1,1,1,2,3,3, 3-heptafluoropropane (HFC-227ea), but no carbon dioxide are contained, the blowing agent composition contains or consists of less than 50% by weight of 1,1,1,3,3-pentafluorobutane and more than 50% by weight of 1,1,1, 2-tetrafluoroethane; 1,1,1,3,3-pentafluoropropane; 1,1,1,3,3, 3-hexafluoropropane or 1,1,1,2,3,3,3-heptafluoropropane. The same proviso also applies to this embodiment, provided that no further blowing agent from the group of low-boiling, optionally halogenated hydrocarbons, ethers and halogenated ethers is contained.

A further object of the invention are essentially closed-cell foamed synthetic resins, which are characterized by containing the inventive blowing agent composition in the cells. In particular, it is a question of essentially closed-cell, foamed, thermoplastic synthetic resins, preferably based on polystyrene, polyethylene, polypropylene, PVC or PET and, in particular, of polystyrene.

The thermoplastic foams, which can be obtained with the inventive method, have the advantage that the closed-cell character is better than that obtained when, for example, HFC-134a is used as blowing agent. In the case of polystyrene melt, the processability is noted to be better than when HFC-134a is used by itself. The inventive blowing agents are sufficiently soluble. The inventive blowing agents have no ODP and only a slight GWP. The effect on the formation of photosmog is extremely slight.

Improved properties in relation to thermal conductivity are a particular advantage of the inventive foams. Compared to using only HFC-134a, HFC-152a and HFC-32 as blowing agent, the residual content of blowing agent in the cells of the foam, is higher.

The following examples are intended to illustrate the invention in further detail without limiting its scope.

EXAMPLE 1
Preparation of Polyurethane Foams

For preparing the polyurethane foam, a polyol mixture, consisting of 40 parts by weight of an ethylenediamine/propylene oxide polyether, having an OH number of 480, 60 parts by weight of a sorbitol/glycerin/propylene oxide polyether having an OH number of 490, 1 part by weight of foam stabilizer (DC 193 of the Dow Corning Corporation) and 1.5 parts by weight of dimethylcyclohexylamine was used as starting material. Diphenylmethane diisocyanate was used as isocyanate component in an amount of 10% in excess of the stoichiometric amount.

The polyurethane foams were produced in a low-pressure installation, which has an output of approximately 8 kg/min and into which it is possible to meter three components. A static mixer was used as mixing unit.

a) Use of HFC-365mfc/152a

Pursuant to the invention, a blowing agent composition was used in an amount of 30 parts by weight, based on the polyol components. Pursuant to the invention, the blowing agent composition consisted of 70 parts by weight of HFC-365mfc and 30 parts by weight of HFC-152a. In addition, 1 part by weight of water was used as chemical blowing agent. With the inventive blowing agent composition, a rigid expanded polyurethane foam, with a fine-celled structure and a density of approximately 32 kg/m$^3$ and with little shrinkage, was produced.

b) Use of HFC-365mfc/32

Pursuant to the invention, a blowing agent composition was used in an amount of 30 parts by weight, based on the polyol components. Pursuant to the invention, the blowing agent composition consisted of 80 parts by weight of HFC-365mfc and 20 parts by weight of HFC-32. In addition, 1 part by weight of water was used as a chemical blowing agent. With this inventive blowing agent composition, a rigid expanded polyurethane foam, with a fine-celled structure and a density of approximately 28 kg/m$^3$ and with little shrinkage, was produced.

c) Use of HFC-365mfc/152a/CO$_2$

Pursuant to the invention, a blowing agent composition was used in an amount of 22 parts by weight, based on the polyol components. Pursuant to the invention, the blowing agent composition consisted of 70 parts by weight of HFC-365mfc and 30 parts by weight of HFC-152a. In addition to the inventive blowing agent composition, 8 parts by weight of a liquefied carbon dioxide were used in accordance with DE 44 39 082. Furthermore, 1 part by weight of water was used as chemical blowing agent.

With the inventive blowing agent composition, a rigid expanded polyurethane foam, with a fine-celled structure and a density of approximately 26 kg/m$^3$ and with little shrinkage, was produced.

EXAMPLE 2
Preparation of a Polystyrene Foam a) Use of HFC-365mfc/152a

Polystyrene (200 kg), having a melt index of 3.0–110, was mixed with 2 kg of talcum as nucleating agent. This mixture was added to a conventional extruder and melted. By means of an injection nozzle, approximately 8% by weight of the inventive blowing agent, based on the polystyrene, was metered into the polystyrene melt in the melt zone of the extruder. The inventive blowing agent mixture contained 30% by weight of HFC-365mfc and 70% by weight of HFC-152a.

The polystyrene melt was mixed homogeneously in the mixing zone with the inventive blowing agent composition and the mixture obtained was subsequently extruded over a nozzle. A closed-cell foam, with a uniform, fine cell structure, was obtained.

Polystyrene foam sheets as well as polystyrene foam panels were produced pursuant to the invention. A polystyrene foam sheet, produced pursuant to the invention, had a density of 38 kg/m$^3$ and a polystyrene foam panel, produced pursuant to the invention, had a density of 35 kg/m$^3$.

b) Use of HFC-365mfc/32

As described under Example 2a), about 6% by weight of an inventive blowing agent, based on polystyrene, was injected into a polystyrene melt. The inventive blowing agent composition contained 30% by weight of HFC-365mfc and 70% by weight of HFC-32.

A polystyrene sheet, produced pursuant to the invention, had a density of 42 kg/m$^3$ and a polystyrene foamed panel, produced pursuant to the invention, had a density of 39 kg/m$^3$.

c) Use of HFC-365mfc/134a/152a

As described under Example 2a), about 8.5% by weight of an inventive blowing agent, based on polystyrene, was injected into a polystyrene melt. The inventive blowing agent composition contained 30 parts by weight of HFC-365mfc and 14 parts by weight of HFC-134a and 56 parts by weight of HFC-152a.

A polystyrene sheet, produced pursuant to the invention, had a density of 40 kg/m$^3$ and a polystyrene foamed panel, produced pursuant to the invention, had a density of 38 kg/m$^3$.

d) Use of HFC-365mfc/152a/CO$_2$

As described under Example 2a), about 5.5% by weight of an inventive blowing agent, based on polystyrene, was injected into a polystyrene melt. The inventive blowing agent composition contained 30 parts by weight of HFC-365mfc and 70 parts by weight of HFC-152a. In addition to the inventive blowing agent composition, 8 parts by weight of liquefied carbon dioxide were also used in accordance with German patent 44 39 082.

A polystyrene sheet, produced pursuant to the invention, had a density of 36 kg/m$^3$ and a polystyrene foamed panel, produced pursuant to the invention, had a density of 33 kg/m$^3$.

EXAMPLE 3
Preparation of a Polyethylene Foam a) Use of HFC-365mfc/152a

Polyethylene (200 kg), having a melt index of 3.5–150, was extruded under conditions similar to those employed in Example 2 for polystyrene. Approximately 9 parts by weight of a blowing agent composition, based on the polyethylene, were injected. Pursuant to the invention, a blowing agent composition of 30 parts by weight of HFC-365mfc and 70 parts by weight of HFC-152a, was used. A fine-cell polyethylene foam with a low shrinkage was obtained. The foamed polyethylene pipe, produced pursuant to the invention, had a density of 38 kg/m$^3$.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A method for producing a polyurethane foam or a foamed thermoplastic synthetic resin by foaming a polyurethane or a thermoplastic resin with the aid of a blowing agent, wherein the blowing agent comprises a) pentafluorobutane, and b) at least one further blowing agent selected from the group consisting of low-boiling, aliphatic hydrocarbons selected from the group consisting of ethane, propane and butane; halogenated hydrocarbons; ethers and halogenated ethers; difluoromethane (HFC-32); difluoroethane; 1,1,2,2-tetrafluoroethane (HFC-134); 1,1,1,2-tetrafluoroethane (HFC-134a); pentafluoropropane; hexafluoropropane, and heptafluoropropane.

2. A method according to claim 1, wherein said pentafluorobutane is 1,1,1,3,3-pentafluorobutane (HFC-365mfc), and said further blowing agent comprises 1,1-difluoroethane (HFC-152a), 1,1,1,3,3-pentafluoropropane (HFC-245fa), 1,1,2,3,3,3-hexafluoropropane (HFC-236ea), 1,1,1,3,3,3-hexafluoropropane (HFC-236fa) or 1,1,1,2,3,3,3-heptafluoropropane (HFC-227ea).

3. A method according to claim 1, wherein said blowing agent comprises 5 to 95% by weight of 1,1,1,3,3-pentafluorobutane (HFC-365mfc).

4. A method according to claim 1, wherein said blowing agent is a composition selected from the group consisting of HFC-365mfc and HFC-152a;
HFC-365mfc and HFC-32;
HFC-365mfc, HFC-152a and $CO_2$;
HFC-365mfc, HFC-32 and $CO_2$;
HFC-365mfc, HFC-152a and butane;
HFC-365mfc, HFC-32 and butane;
HFC-365mfc, HFC-152a and HFC-134a;
HFC-365mfc, HFC-32 and HFC-134a;
HFC-365mfc and dimethyl ether;
HFC-365mfc and propane;
HFC-365mfc and ethane;
HFC-365mfc, butane and $CO_2$;
HFC-365mfc, propane and $CO_2$, and
HFC-365mfc, ethane and $CO_2$.

5. A method according to claim 1, wherein said blowing agent comprises 10 to 70% by weight of HFC-365mfc and 90 to 30% by weight of at least one other component.

6. A method according to claim 5, wherein said at least one other component comprises HFC-32 or HFC-152a.

7. A method according to claim 1, wherein said blowing agent further comprises 2 to 50% by weight of carbon dioxide.

8. A method according to claim 1, wherein said blowing agent further comprises up to 30% by weight of at least one foam property modifying additive selected from the group consisting of flame retardants and plasticisers.

9. A method according to claim 1, wherein a polyurethane is foamed, and said blowing agent composition comprises from 1 to 50% by weight of the total mixture of blowing agent and polyurethane.

10. A method according to claim 1, wherein a thermoplastic synthetic resin selected from the group consisting of polystyrene, polyethylene, polyvinyl chloride and polyethylene terephthalate, is foamed, and said blowing agent composition comprises from 1 to 30% by weight of the total mixture of blowing agent and thermoplastic synthetic resin.

11. A method according to claim 10, wherein said thermoplastic synthetic resin is polystyrene.

12. A blowing agent composition comprising a) pentafluorobutane and b) at least one further blowing agent selected from the group comprising low-boiling, aliphatic hydrocarbons selected from the group consisting of ethane, propane and butane; halogenated hydrocarbons; ethers and halogenated ethers; difluoromethane (HFC-32); difluoroethane; 1,1,2,2-tetrafluoroethane (HFC-134); 1,1,1,2-tetrafluoroethane (HFC-134a); pentafluoropropane; hexafluoropropane; and heptafluoropropane.

13. A blowing agent composition according to claim 12, comprising a) 1,1,1,3,3-pentafluorobutane (HFC-365mfc) and b) at least one further blowing agent selected from the group consisting of difluoroethane (HFC-152a), 1,1,1,3,3-pentafluoropropane (HFC-245fa), 1,1,2,3,3,3-hexafluoropropane (HFC-236ea), 1,1,1,3,3,3-hexafluoropropane (HFC-236fa), and 1,1,1,2,3,3,3-heptafluoropropane (HFC-227ea).

14. A blowing agent composition according to claim 12, comprising 5 to 95% by weight of 1,1,1,3,3-pentafluorobutane (HFC-365mfc).

15. A blowing agent composition according to claim 12, wherein said blowing agent composition is selected from the group consisting of:

HFC-365mfc and HFC-152a;
HFC-365mfc and HFC-32;
HFC-365mfc, HFC-152a and $CO_2$;
HFC-365mfc, HFC-32 and $CO_2$;
HFC-365mfc, HFC-152a and butane;
HFC-365mfc, HFC-32 and butane;
HFC-365mfc, HFC-152a and HFC-134a;
HFC-365mfc, HFC-32 and HFC-134a;
HFC-365mfc and dimethyl ether;
HFC-365mfc and propane;
HFC-365mfc and ethane;
HFC-365mfc, butane and $CO_2$;
HFC-365mfc, propane and $CO_2$; and
HFC-365mfc, ethane and $CO_2$.

16. A blowing agent composition according to claim 12, comprising 10 to 70% by weight of 1,1,1,3,3-pentafluorobutane (HFC-365mfc) and 90 to 30% by weight of at least one other blowing agent component.

17. A blowing agent composition according to claim 16, wherein said at least one other blowing agent component comprises difluoromethane (HFC-32) or 1,1-difluoroethane (HFC-152a).

18. A blowing agent composition according to claim 12, further comprising 2 to 50% by weight of liquefied carbon dioxide.

19. A blowing agent composition according to claim 12, wherein if a) is 1,1,1,3,3-pentafluorobutane and b) is 1,1,1,2-tetrafluoroethane (HFC-134a); 1,1,1,3,3-pentafluoropropane (HFC-245fa); 1,1,1,3,3,3-hexafluoropropane (HFC-236fa) or 1,1,1,2,3,3,3-heptafluoropropane (HFC-227ea), and the blowing agent composition is free of carbon dioxide, then said blowing agent composition comprises less than 50% by weight of 1,1,1,3,3-pentafluorobutane and more than 50% by weight of 1,1,1,2-tetrafluoroethane; 1,1,1,3,3-pentafluoropropane; 1,1,1,3,3,3-hexafluoropropane or 1,1,1,2,3,3,3-heptafluoropropane.

20. A method according to claim 1, wherein if a) is 1,1,1,3,3-pentafluorobutane and b) is 1,1,1,2-tetrafluoroethane (HFC-134a); 1,1,1,3,3-pentafluoropropane (HFC-245fa); 1,1,1,3,3,3-hexafluoropropane (HFC-236fa) or 1,1,1,2,3,3,3-heptafluoropropane (HFC-227ea), and the blowing agent composition is free of carbon dioxide, then said blowing agent composition comprises less than 50% by weight of 1,1,1,3,3-pentafluorobutane and more than 50% by weight of 1,1,1,2-tetrafluoroethane; 1,1,1,3,3-pentafluoropropane; 1,1,1,3,3,3-hexafluoropropane or 1,1,1,2,3,3,3-heptafluoropropane.

21. A predominantly closed-cell, foamed thermoplastic resin comprising a blowing agent composition according to claim 12, in the closed cells.

22. A foamed thermoplastic resin according to claim 21, wherein said resin is selected from the group consisting of polystyrene, polyethylene, polypropylene, polyvinylchloride, and polyethylene terephthalate.

23. A predominantly closed-cell polyurethane foam comprising a blowing agent composition in the closed cells, said blowing agent composition comprising a) pentafluorobutane and b) at least one further blowing agent selected from the group comprising low-boiling, aliphatic hydrocarbons selected from the group consisting of ethane, propane and butane; halogenated hydrocarbons; ethers and halogenated ethers; difluoromethane (HFC-32); difluoroethane; 1,1,2,2-tetrafluoroethane (HFC-134); 1,1,1,2-tetrafluoroethane (HFC-134a); pentafluoropropane; hexafluoropropane; and heptafluoropropane.

24. A predominantly closed-cell polyurethane foam according to claim 23, wherein said blowing agent composition comprises a) 1,1,1,3,3-pentafluorobutane (HFC-365mfc) and b) at least one further blowing agent selected from the group consisting of 1,1-difluoroethane (HFC-152a), 1,1,1,3,3-pentafluoropropane (HFC-245fa), 1,1,2,3,3,3-hexafluoropropane (HFC-236ea), 1,1,1,3,3,3-hexafluoropropane (HFC-236fa) or 1,1,1,2,3,3,3-heptafluoropropane (HFC-227ea).

25. A blowing agent mixture useful for producing polyurethane foams with improved thermal conductivity properties at low temperatures, said blowing agent mixture comprising from 1 to less than 50% by weight 1,1,1,3,3-pentafluorobutane and from more than 50% to 99% by weight of at least one fluorinated hydrocarbon selected from the group consisting of 1,1,1,2-tetrafluoroethane, 1,1,1,3,3-pentafluoropropane, 1,1,1,3,3,3-hexafluoropropane and 1,1,1,2,3,3,3-heptafluoro-propane.

* * * * *